(12) United States Patent
Grandi et al.

(10) Patent No.: US 10,775,845 B2
(45) Date of Patent: Sep. 15, 2020

(54) TECHNOLOGIES FOR CONTEXT AWARE GRAPHICAL USER INTERFACES FOR MOBILE COMPUTE DEVICES

(71) Applicant: Intel Corporation, Santa Clara, CA (US)

(72) Inventors: Andrea Grandi, Limerick (IE); Stephanie Courtney, Bray (IE)

(73) Assignee: Intel Corporation, Santa Clara, CA (US)

( * ) Notice: Subject to any disclaimer, the term of this patent is extended or adjusted under 35 U.S.C. 154(b) by 887 days.

(21) Appl. No.: 15/073,816

(22) Filed: Mar. 18, 2016

(65) Prior Publication Data
US 2017/0269790 A1    Sep. 21, 2017

(51) Int. Cl.
| | |
|---|---|
| *G06F 1/16* | (2006.01) |
| *G06F 3/0481* | (2013.01) |
| *H04B 17/318* | (2015.01) |
| *G06F 3/0488* | (2013.01) |
| *G06F 3/01* | (2006.01) |

(Continued)

(52) U.S. Cl.
CPC .......... *G06F 1/163* (2013.01); *G06F 1/1626* (2013.01); *G06F 3/014* (2013.01); *G06F 3/0482* (2013.01); *G06F 3/04886* (2013.01); *H04B 17/23* (2015.01); *H04B 17/318* (2015.01)

(58) Field of Classification Search
CPC ...... G06F 3/0481; G06F 1/163; G06F 1/1626; G06F 3/014; G06F 3/0482; G06F 3/04847; G06F 3/0488; G06F 3/04886; H04B 17/23; H04B 17/318; H04W 88/02
See application file for complete search history.

(56) References Cited

U.S. PATENT DOCUMENTS

| | | | |
|---|---|---|---|
| 2014/0085220 A1* | 3/2014 | Gossweiler, III | G06F 3/0488 345/173 |
| 2014/0335916 A1 | 11/2014 | Thorson et al. | |
| 2015/0054639 A1 | 2/2015 | Rosen | |

(Continued)

FOREIGN PATENT DOCUMENTS

| | | |
|---|---|---|
| EP | 2779605 | 9/2014 |
| EP | 2957983 | 12/2015 |

OTHER PUBLICATIONS

International search report for PCT application No. PCT/US2017/018151, dated May 24, 2017 (3 pages).

(Continued)

*Primary Examiner* — Jennifer N To
*Assistant Examiner* — Amy P Hoang
(74) *Attorney, Agent, or Firm* — Barnes & Thornburg LLP

(57) ABSTRACT

Technologies for context aware graphical user interfaces for mobile compute devices include a mobile compute device that includes a touchscreen display, a wireless signal sensor to receive a wireless signal transmitted by a wearable device, a context determination module, and a graphical user interface manager module. The context determination module is to measure a strength of the wireless signal and identify which hand of the user is presently used to hold the mobile compute device based on the measured strength of the wireless signal. The graphical user interface manager module is to configure a graphical user interface displayed on the touchscreen display based on the identification of the hand of the user presently used to hold the mobile compute device.

21 Claims, 8 Drawing Sheets

(51) Int. Cl.
G06F 3/0482 (2013.01)
H04B 17/23 (2015.01)

(56) References Cited

U.S. PATENT DOCUMENTS

2015/0242015 A1* 8/2015 Cho ..................... G06F 3/044
345/174
2017/0238138 A1* 8/2017 Aminzade ........... H04L 41/0816
726/19

OTHER PUBLICATIONS

Written opinion report for PCT application No. PCT/US2017/018151, dated May 24, 2017 (9 pages).

* cited by examiner

TECHNOLOGIES FOR CONTEXT AWARE GRAPHICAL USER INTERFACES FOR MOBILE COMPUTE DEVICES

BACKGROUND

Handheld mobile compute devices, such as smartphones, are increasingly used for personal and business use. In many instances, these mobile compute devices are used to perform tasks that were once performed using larger compute devices, such as desktop systems. To facilitate such use, manufacturers have made the sizes of touchscreens of the mobile compute devices larger. Unfortunately, the average size of a human thumb for both men and women does not span the height and sometimes the width of the touchscreen of most modern mobile compute devices. Accordingly, while the increased touchscreen size enables a modern mobile compute device to present larger graphical user interfaces for viewing and interacting with content, a user may experience hand strain as the user attempts to reach graphical user interface elements with the hand that is holding the mobile compute device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
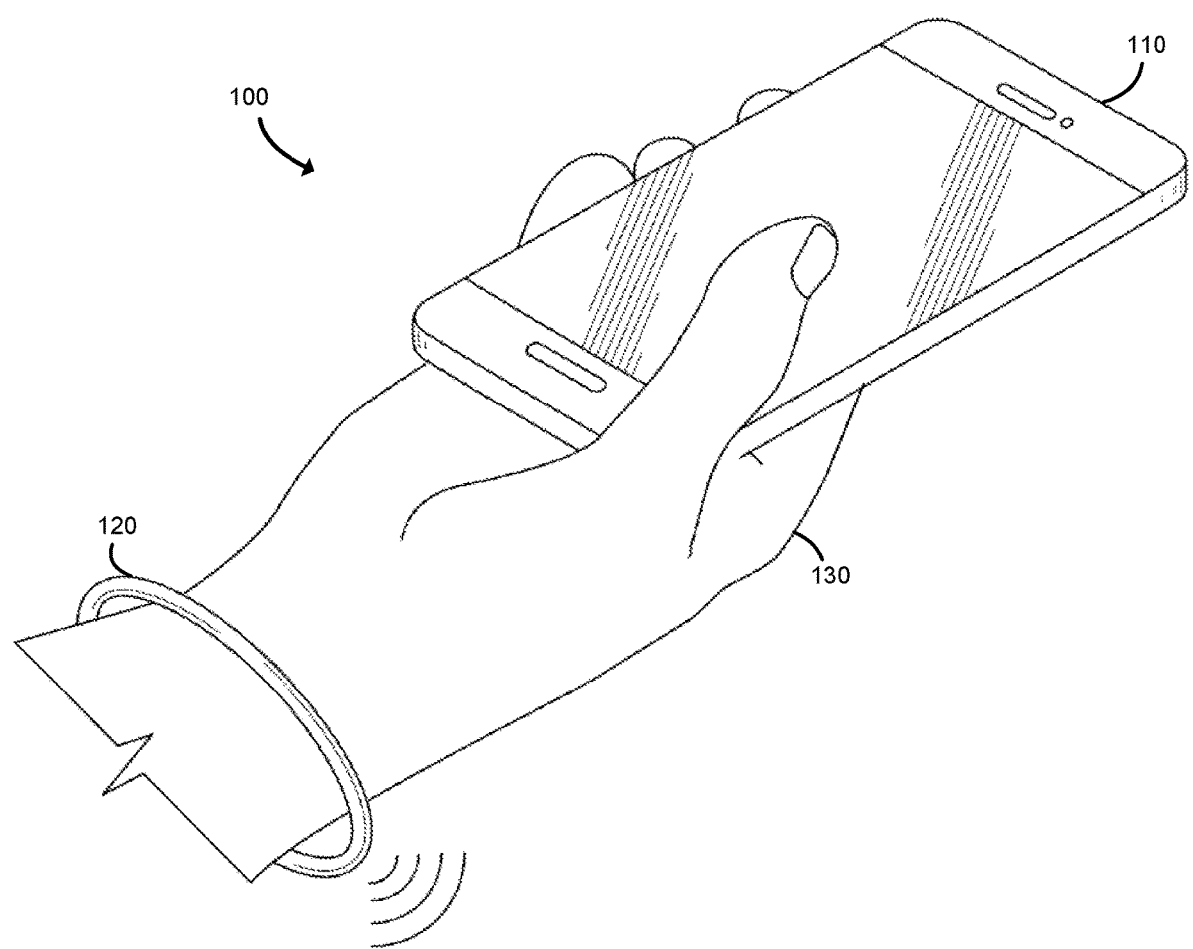
FIG. 1 is a simplified block diagram of at least one embodiment of a system for configuring a graphical user interface (GUI) of a mobile compute device based on which hand is used to hold the mobile compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for configuring a graphical user interface (GUI) includes a mobile compute device 110 and a wearable device 120 that is associated with (e.g., worn on or near) a hand 130 of a user, which may hold the mobile compute device 110 during use. In use, as described in more detail herein, the mobile compute device 110 is configured to identify which hand of the user is presently holding the mobile compute device 110, based on a measured strength of a wireless signal emitted by the wearable device 120, and configure the GUI of the mobile compute device 110 based on the identified user's hand. By configuring the GUI based on an identification of the hand that the mobile device 110 is presently held with, for example by moving graphical user interface elements (i.e., components of the graphical user interface) to receive input from and/or display content to the user) to be within reach of the thumb of the hand 130, the mobile device 110 makes interaction with the GUI easier and reduces hand strain.

Figure 2:
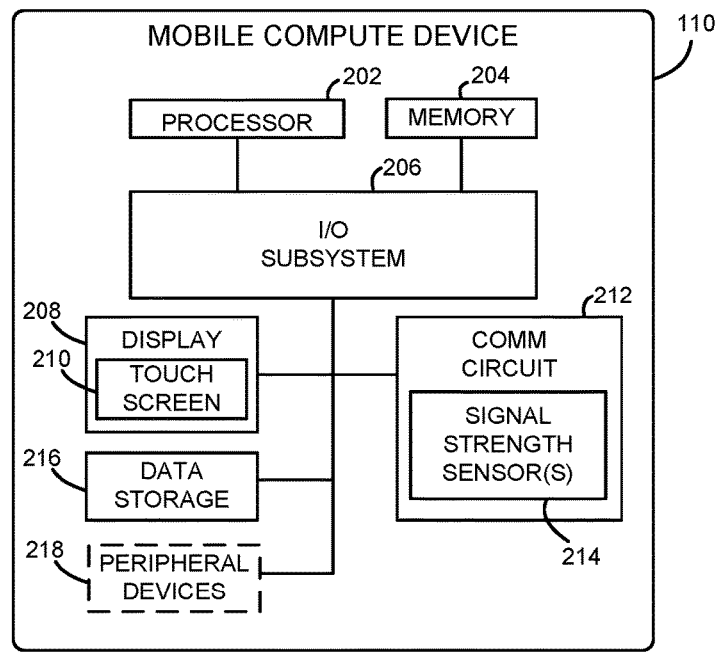
FIG. 2 is a simplified block diagram of at least one embodiment of the mobile compute device of the system of FIG. 1.

Referring now to FIG. 2, the mobile compute device 110 may be embodied as any type of mobile compute device capable of performing the functions described herein. For example, in some embodiments, the mobile compute device 110 may be embodied as a smartphone, a tablet computer, a mobile media device, a game console, a mobile internet device (MID), a personal digital assistant, a mobile appliance device, or other mobile compute device. The illustrative mobile compute device 110 includes a processor 202, a memory 204, an input/output subsystem 206, and a display 208. Of course, the mobile compute device 110 may include other or additional components, such as those commonly found in a mobile compute and/or communication device (e.g., various input/output devices), in other embodiments. Additionally, in some embodiments, one or more of the illustrative components may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor may be embodied as a single or multi-core processor(s) having one or more processor cores, a digital signal processor, a microcontroller, or other processor or processing/controlling circuit. Similarly, the memory 204 may be embodied as any type of volatile or non-volatile memory or data storage currently known or developed in the future and capable of performing the functions described herein. In operation, the memory 204 may store various data and software used during operation of the mobile compute device 110 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the mobile compute device 110. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the mobile compute device 110, on a single integrated circuit chip.

The display 208 of the mobile compute device may be embodied as any type of display on which information may be displayed to a user of the mobile compute device 110. Illustratively, the display 208 is embodied as a touchscreen display and includes a corresponding touchscreen sensor 210 to receive tactile input and data entry from the user. The display 208 may be embodied as, or otherwise use, any suitable display technology including, for example, a liquid crystal display (LCD), a light emitting diode (LED) display, a cathode ray tube (CRT) display, a plasma display, and/or other display usable in a mobile compute device. Similarly, the touchscreen sensor 210 may use any suitable touchscreen input technology to detect the user's tactile selection of information displayed on the display 208 including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

The illustrative mobile compute device 110 additionally includes a communication circuit 212. The communication circuit 212 may be embodied as one or more devices and/or circuitry for enabling communications with one or more remote devices over a network and for enabling wireless communication with devices, such as the wearable device 120, that are within a predefined range of the mobile compute device 110. The communication circuit 212 may be configured to use any suitable communication protocol to communicate with other devices including, for example, cellular communication protocols, wireless data communication protocols, and/or wired data communication protocols. As described in more detail herein, in the illustrative mobile compute device 110, the communication circuit 212 includes one or more signal strength sensors 214 configured to measure a strength of a wireless signal, such as a Bluetooth signal or a near field communication (NFC) signal emitted by a device, such as the wearable device 120. As described in more detail herein, the illustrative mobile compute device 110, may be configured to identify which hand of a user is holding the mobile compute device 110 based on the measured strength.

The illustrative mobile compute device 110 may also include a data storage device 216. The data storage device 216 may be embodied as any type of device or devices configured for short-term or long-term storage of data such as, for example, memory devices and circuits, memory cards, hard disk drives, solid-state drives, or other data storage devices. The data storage device 216 may store, for example, settings, graphical user interface configuration rules, and/or predefined graphical user interfaces, as described in more detail herein.

In some embodiments, the mobile compute device 110 may further include one or more peripheral devices 218. Such peripheral devices 218 may include any type of peripheral device commonly found in a mobile compute device such as speakers, a hardware keyboard, input/output devices, peripheral communication devices, antennas, and/or other peripheral devices.

Referring again to FIG. 1, the wearable device 120 may be embodied as any type compute device capable of being worn by the user and performing the functions described herein, including, without limitation, a pedometer device, a heartrate measurement device, and/or any other compute device configured to be worn in association with one hand of a user (e.g., the hand 130) and to communicate wirelessly with the mobile compute device 110. For example, in the illustrative embodiment, the wearable device 120 may be configured to generate and wirelessly transmit exercise and/or other physiological data regarding the wearer of the wearable device 120 to the mobile device 110. As such, the wearable device 120 may include sensors configured to measure various characteristics of the user (e.g., biometric characteristics) depending on the type of wearable device. Further, the wearable device 120 may include components commonly found in a compute device such as a processor, an I/O subsystem, a memory, a data storage device, communication circuitry, and one or more peripheral devices. Such components may be substantially similar to those like components of the mobile compute device 110 described above. As such, further descriptions of the like components are not repeated herein with the understanding that the description of the corresponding components provided above in regard to mobile compute device 110 applies equally to the corresponding components of the wearable device 120.

Figure 3:
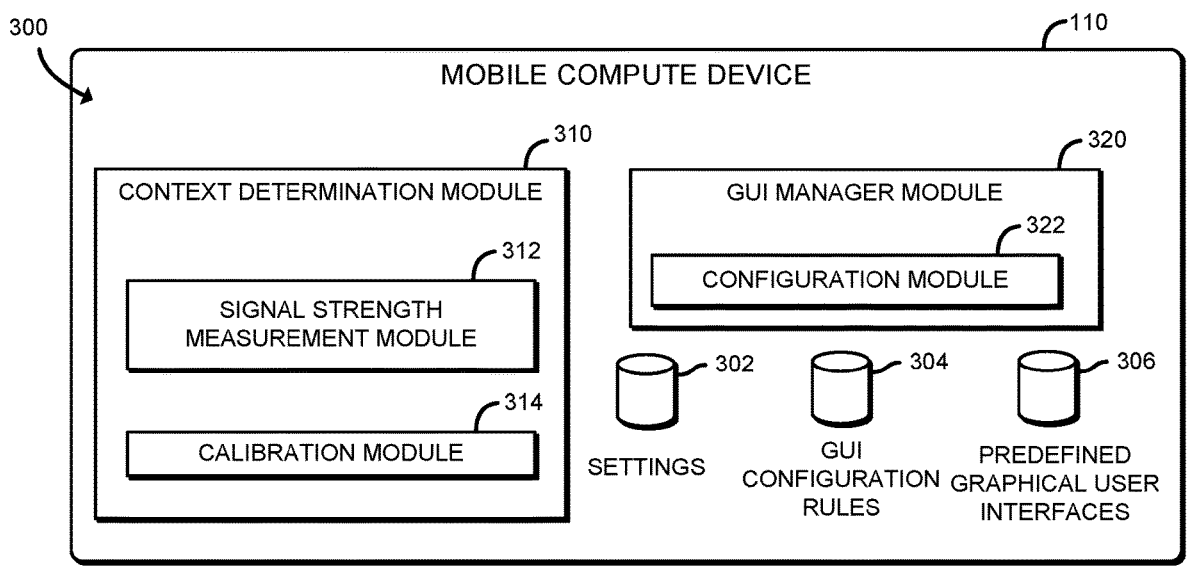
FIG. 3 is a simplified block diagram of at least one embodiment of an environment that may be established by the mobile compute device of FIG. 1.

Referring now to FIG. 3, in an embodiment, the mobile compute device 110 establishes an environment 300 during operation. The illustrative environment 300 includes a context determination module 310 and a graphical user interface (GUI) manager module 320. Each of the modules, logic, and other components of the environment 300 may be embodied as hardware, firmware, software, or a combination thereof. As such, in some embodiments, one or more of the modules of the environment 300 may be embodied as circuitry or collection of electrical devices (e.g., context determination circuitry 310, GUI manager circuitry 320, etc.). It should be appreciated that, in such embodiments, one or more of the context determination circuitry 310 and the GUI manager circuitry 320 may form a portion of one or more of the processor 202, the I/O subsystem 206, and/or other components of the mobile compute device 110. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 202 or other components of the mobile compute device 110. In the illustrative environment 300, the mobile compute device 110 includes settings 302, GUI configuration rules 304, and predefined graphical user interfaces 306, each of which may be accessed by the various modules and/or sub-modules of the mobile compute device 110. It should be appreciated that the mobile compute device 110 may include other components, sub-components, modules, sub-modules, and/or devices commonly found in a mobile compute device, which are not illustrated in FIG. 3 for clarity of the description.

The context determination module 310, which may be embodied as hardware, firmware, software, virtualized hardware, emulated architecture, and/or a combination thereof as discussed above, is configured to identify which hand (e.g., the hand 130) of the user is presently used to hold the mobile compute device 110. Accordingly, in the illustrative embodiment, the "context" of the mobile compute device 110 defines which hand of the user is presently holding the mobile compute device 110. To do so, the context determination module 310 includes a signal strength measurement module 312 and a calibration module 314. In the illustrative embodiment, the signal strength measurement module 312 is configured to communicate with the signal strength sensor 214 of FIG. 2 to determine a measured strength of a wireless signal transmitted from the wearable device 120. In some embodiments, the signal strength measurement module 312 polls the signal strength sensor 214 at a predefined interval to enable the context determination module 310 to continually determine and re-determine which hand is holding the mobile compute device 110. Additionally or alternatively, the context determination module 310 may be configured to determine the context of the mobile compute device 110 in response to a request (e.g., an application programming interface (API) call) from an application executed by the mobile compute device 110 and provide the identification of the hand in response to the request. As the hand 130 associated with the wearable device 120 moves closer and further away from the mobile compute device 110, the strength of the wireless signal increases and decreases correspondingly. Accordingly, when the hand 130 is holding the mobile compute device 110, the measured signal strength is greater than when the other hand (not shown) of the user is instead holding the mobile compute device 110.

In the illustrative embodiment, the calibration module 314 is configured to perform a calibration process to identify and store a threshold signal strength value that is indicative of the hand 130 associated with the wearable device 120 holding the mobile compute device 110. The calibration module 314 may be configured to prompt the user to hold the mobile compute device 110 with the hand 130 associated with the wearable device 120. The signal strength measurement module 312 may be configured to then measure the wireless signal strength. The calibration module 314 may be configured to then prompt the user to switch hands such that the user is holding the mobile compute device 110 with the hand that is not associated with the wearable device 120, and the signal strength measurement module 312 may be configured to measure the wireless signal strength again. Further, the calibration module 314 may be configured to cause the signal strength measurement module 312 to measure the wireless signal strength in either context multiple times. In such embodiments, the calibration module 314 may average the measured signal strengths and store the average as the threshold signal strength value that is indicative of the user holding the mobile compute device 110 with the hand 130 associated with the wearable device 120. Additionally, the calibration module 314 may be configured to prompt the user to indicate which hand (i.e., left hand or right hand) the wearable device 120 is associated with, and store the indication in the settings 302 in association with the threshold signal strength value.

In the illustrative embodiment, the calibration module 314 may be additionally configured to prompt the user to specify what action to take when the context determination module 310 determines the context or a change in the context (i.e., the user initially holding the mobile compute device 110 with one hand and then switching to the other hand). For example, in the illustrative embodiment, the context determination module 314 may be configured to prompt the user whether the mobile compute device 110 is to automatically configure the GUI in response to determining the context, prompt the user for whether to configure the GUI upon determining the context, or do nothing (i.e., do not modify the GUI). The context determination module 314 may be configured to store the user's response to the prompt as a user GUI preference in the settings 302. It should be appreciated that each of the signal strength measurement module 312 and the calibration module 314 of the context determination module 310 may be separately embodied as hardware, firmware, software, virtualized hardware, emulated architecture, and/or a combination thereof. For example, the signal strength measurement module 312 may be embodied as a hardware component, while the calibration module 314 is embodied as a virtualized hardware component or as some other combination of hardware, firmware, software, virtualized hardware, emulated architecture, and/or a combination thereof.

The GUI manager module 320, which may be embodied as hardware, firmware, software, virtualized hardware, emulated architecture, and/or a combination thereof as discussed above, is configured to manage the display of a graphical user interface to the user and to receive input from the user through the graphical user interface. The GUI manager module 320 includes a configuration module 322 that is configured to load or modify a graphical user interface displayed on the touchscreen display based on the identification of the hand of the user presently used to hold the mobile compute device 110. In the illustrative embodiment, the configuration module 322 may be configured to arrange a graphical user interface by moving one or more graphical user interface elements to be within an easily accessible area for the thumb of the hand that is holding the mobile compute device 110. For example, the configuration module 322 may be configured to move a button, text box, menu, virtual keyboard, or other graphical user interface element towards the hand that is holding the mobile compute device 110. Arranging the graphical user interface based on the hand holding the mobile compute device 110 may also include locating one or more graphical user interface elements to be slightly spaced away from the hand that is holding the mobile compute device 110 (i.e., not flush against the edge of the graphical user interface). The configuration module 322 may be configured to apply one or more of the predefined GUI configuration rules 304 to move the graphical user interface elements. The GUI configuration rules 304 may specify a distance, such as an absolute number of pixels, a percentage of the screen size, or another measure of distance to move each of multiple graphical user interface elements, based on the hand that is presently holding the mobile compute device 110. In the illustrative embodiment, the configuration module 322 may also be configured to load and display predefined graphical user interfaces 306 based on the hand that is presently holding the mobile compute device 110, rather than applying the GUI configuration rules 304 to relocate individual user interface elements. It should be appreciated that the configuration module 322 of the GUI manager module 330 may be embodied as hardware, firmware, software, virtualized hardware, emulated architecture, and/or a combination thereof.

Figure 4:
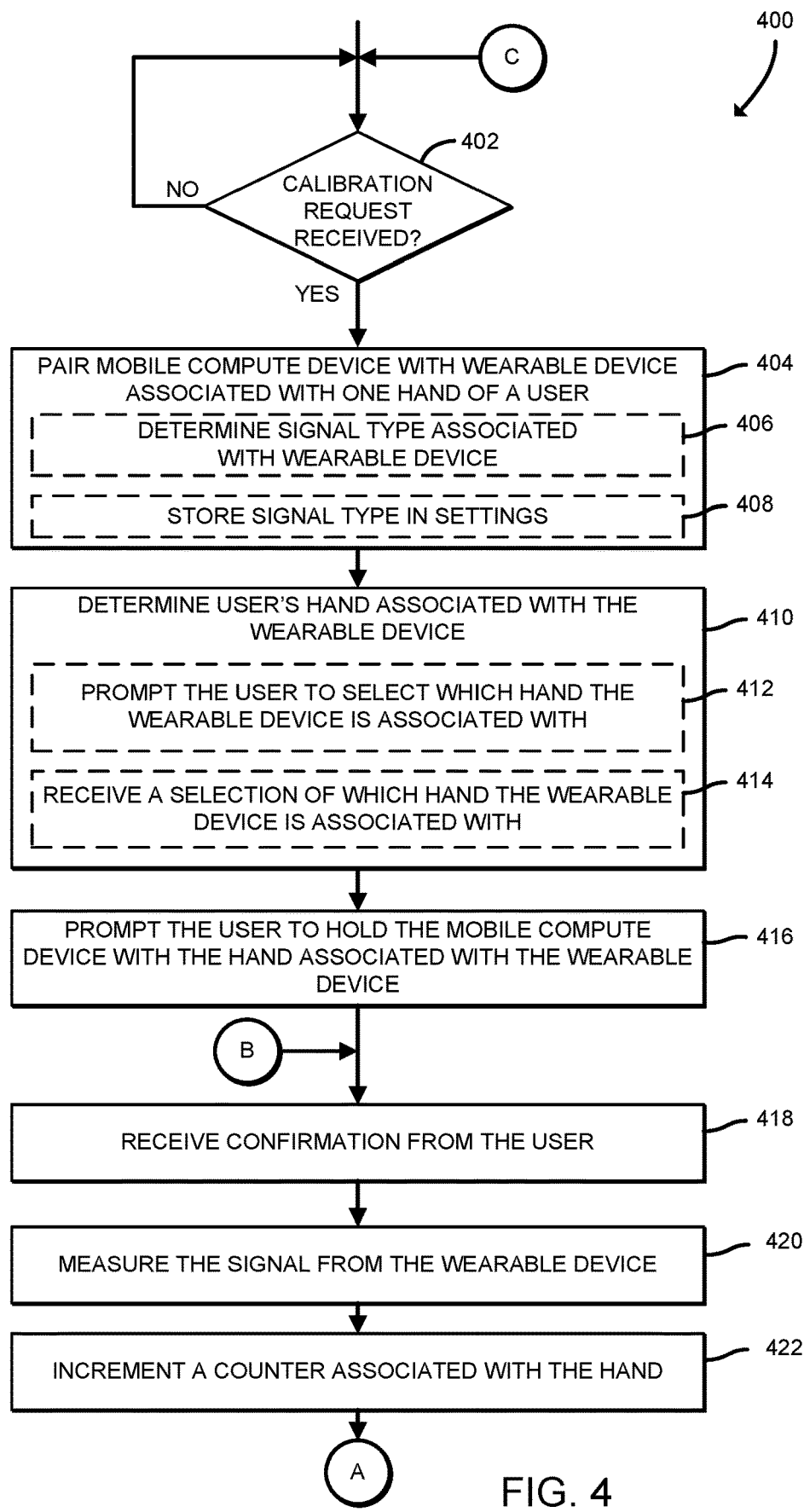
FIGS. 4 and 5 are a simplified flow diagram of at least one embodiment of a method for calibrating the mobile compute device of FIG. 1 to identify which hand is holding the mobile compute device.

Referring now to FIG. 4, in use, the mobile compute device 110 may execute a method 400 for calibrating the mobile compute device to identify which hand is holding the mobile compute device. The method begins in block 402 in which the mobile compute device 110 monitors for a calibration request. The calibration request may be issued by an application executing on the mobile compute device 110 that enables a user to configure settings associated with configuring the display. Additionally or alternatively, an initialization process may issue the calibration request when the mobile compute device 110 is first activated. Additionally or alternatively, the mobile compute device 110 may issue the calibration request upon detecting the wireless signal from the wearable device 120 the first time. In other embodiments, the mobile compute device 110 receives the calibration request based on other conditions. Regardless, if the mobile compute device 110 receives the calibration request, the method 400 advances to block 404 in which the mobile compute device 110 pairs with the wearable device 120 associated with the hand 130 of the user.

As indicated in block 406, in paring with the wearable device 120, the mobile compute device 406 may determine a signal type associated with the wearable device 120, such as a Bluetooth signal, a near field communication signal, or other type of wireless signal. Additionally, in block 408, the mobile compute device 110 may store the signal type in the settings 302 to assist in identifying the wearable device 120 in the future. In some embodiments, the mobile device 110 and the wearable device 120 may exchange device identifiers, a personal identification number (PIN), or other data needed to pair the mobile compute device 110 and the wearable device 120 using the data communication protocol of the wearable device 120 (e.g., Bluetooth).

In block 410, the mobile compute device 110 determines the user's hand (e.g., the hand 130) that is associated with the wearable device 120. In some embodiments, as indicated in block 412, the mobile compute device 110 prompts the user to select which hand the wearable device 120 is associated with. For example, the mobile compute device 110 may display one or more user interface elements, such as radio buttons, a drop down list, or other indicators of the left and right hands, and enable the user to select one of the hands. As indicated at block 414, the mobile compute device 110 receives the selection of which hand the wearable device is associated with. For example, if the wearable device 120 is worn on the user's right wrist, the mobile compute device 110 would receive a selection of the right hand from the user and store the selection in the settings 302.

In block 416, the mobile compute device 110 prompts the user to hold the mobile compute device 110 with the hand associated with the wearable device 120. Following the example above, if the user selected the right hand, the mobile compute device 110 may prompt the user to hold the mobile compute device 110 with the right hand (e.g., the hand 130). In block 418, the mobile compute device 110 receives confirmation from the user that the user is now holding the mobile compute device 110 with the hand associated with the wearable device 120. For example, the mobile compute device 110 may display a confirmation button that the user selects when holding the mobile device 110 with the hand 130 associated with the wearable device 120. In other embodiments, the mobile compute device 110 may receive the confirmation audibly, such as by detecting that the user has spoken a confirmation (e.g., "okay") or by detecting a visual confirmation from the user, such as a head nod. In block 420, the mobile compute device 110 measures the strength of the wireless signal from the wearable device 120. Further, at block 422, the mobile compute device 110 increments a counter associated with the hand 130.

Figure 5:
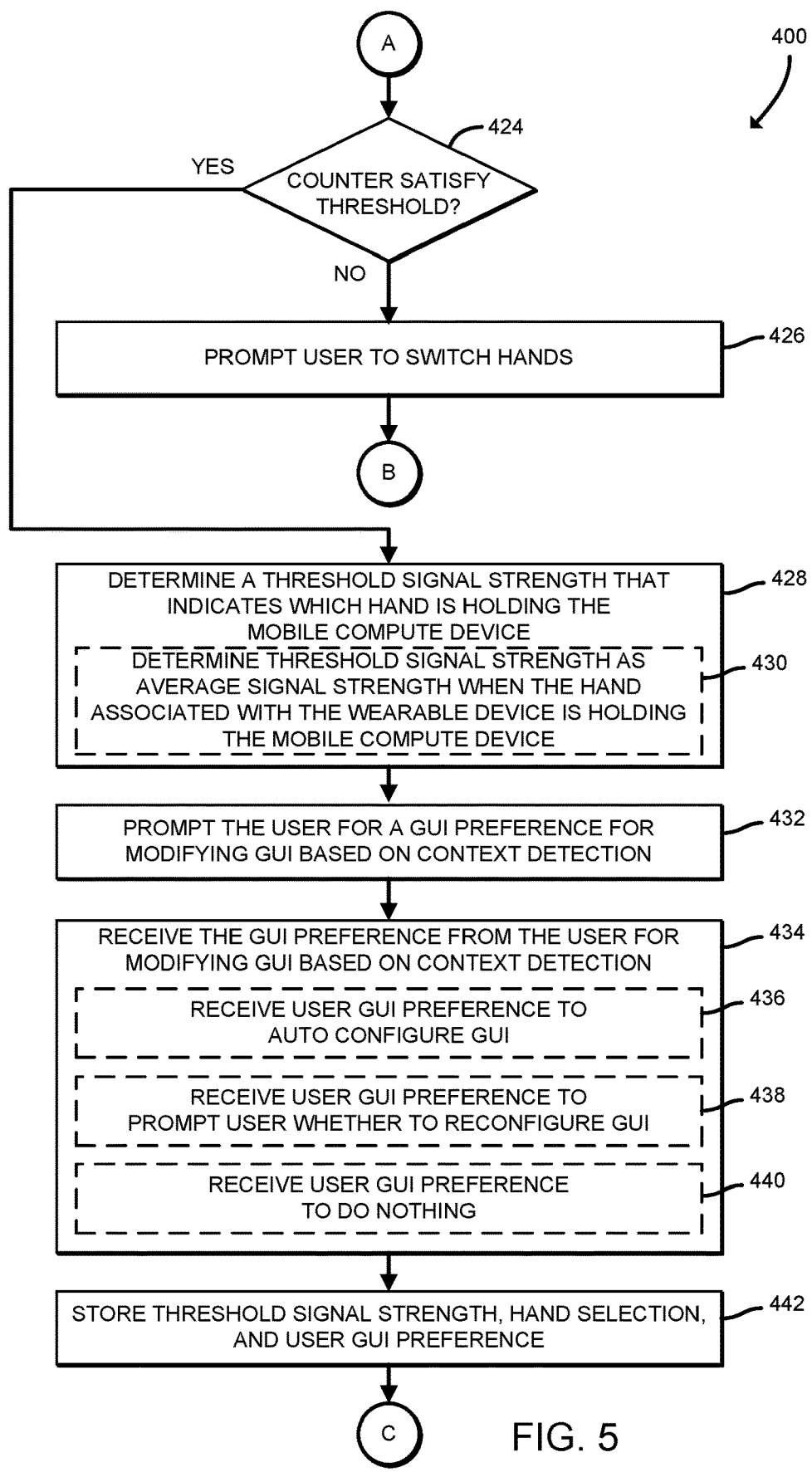

In block 424 of FIG. 5, the mobile compute device 110 compares the counter to a predefined threshold value to determine whether the counter satisfies the predefined threshold value. For example, as described in more detail, the mobile compute device 110 may be configured to measure the signal strength a predefined number of times for each hand, in order to establish a reliable measure of the signal strength when the mobile compute device 110 is being held by the hand 130 associated with the wearable device 120. If the counter does not yet satisfy the threshold value, the method advances to block 426 in which the mobile compute device 110 prompts the user to switch hands. Subsequently, the mobile compute device 110 loops back to block 418 to measure the strength of the signal of the wearable device 120 when the mobile compute device 110 is being held with the hand that is not associated with the wearable device. If, however, the mobile compute device 110 determines that the counter does satisfy the threshold value, the method advances to block 428 in which the mobile compute device 110 determines a threshold signal strength value that indicates which hand is holding the mobile compute device 110. As indicated in block 430, in the illustrative embodiment, the mobile compute device 110 determines the threshold signal strength value as an average signal strength when the hand associated with the wearable device 120 is holding the mobile compute device 110. For example, if the user held the mobile compute device 110 three separate times with the hand that is associated with the wearable device 110, the mobile compute device 110 may determine the average of the measured signal strengths from the three separate times and store the average as the threshold signal strength value in the settings 302.

In block 432, the mobile compute device 110 prompts the user for a GUI preference for modifying the GUI based on context detection. As described above, "context detection" in this description refers to detection of which hand is holding the mobile compute device 110. In block 434, the mobile compute device 110 receives the GUI preference from the user for modifying the GUI based on context detection. In doing so, the mobile compute device 110 may receive a user GUI preference to automatically configure the GUI upon determining the context or a change in the context, as indicated in block 436. Alternatively, the mobile compute device 110 may receive a user GUI preference to prompt the user whether to reconfigure the GUI at the time that the mobile compute device 110 determines the context or a change in the context, as indicated in block 438. Alternatively, the mobile compute device 110 may receive a user GUI preference to do nothing in response to detecting the context or a change in the context, as indicated in block 440. In block 442, the mobile compute device 110 stores the threshold signal strength value, the selection of the hand that is associated with the wearable device 120, and the user GUI preference. In the illustrative embodiment, the mobile compute device 110 stores this data in the settings 302. After performing block 442, the method loops back to block 402 of FIG. 4 to again monitor for a calibration request. For example, the user may initially wear the wearable device 120 on the right wrist and later decide to wear the wearable device 120 on the left wrist. Accordingly, in that situation, the user may open a settings application to recalibrate the mobile device 110.

Figure 6:
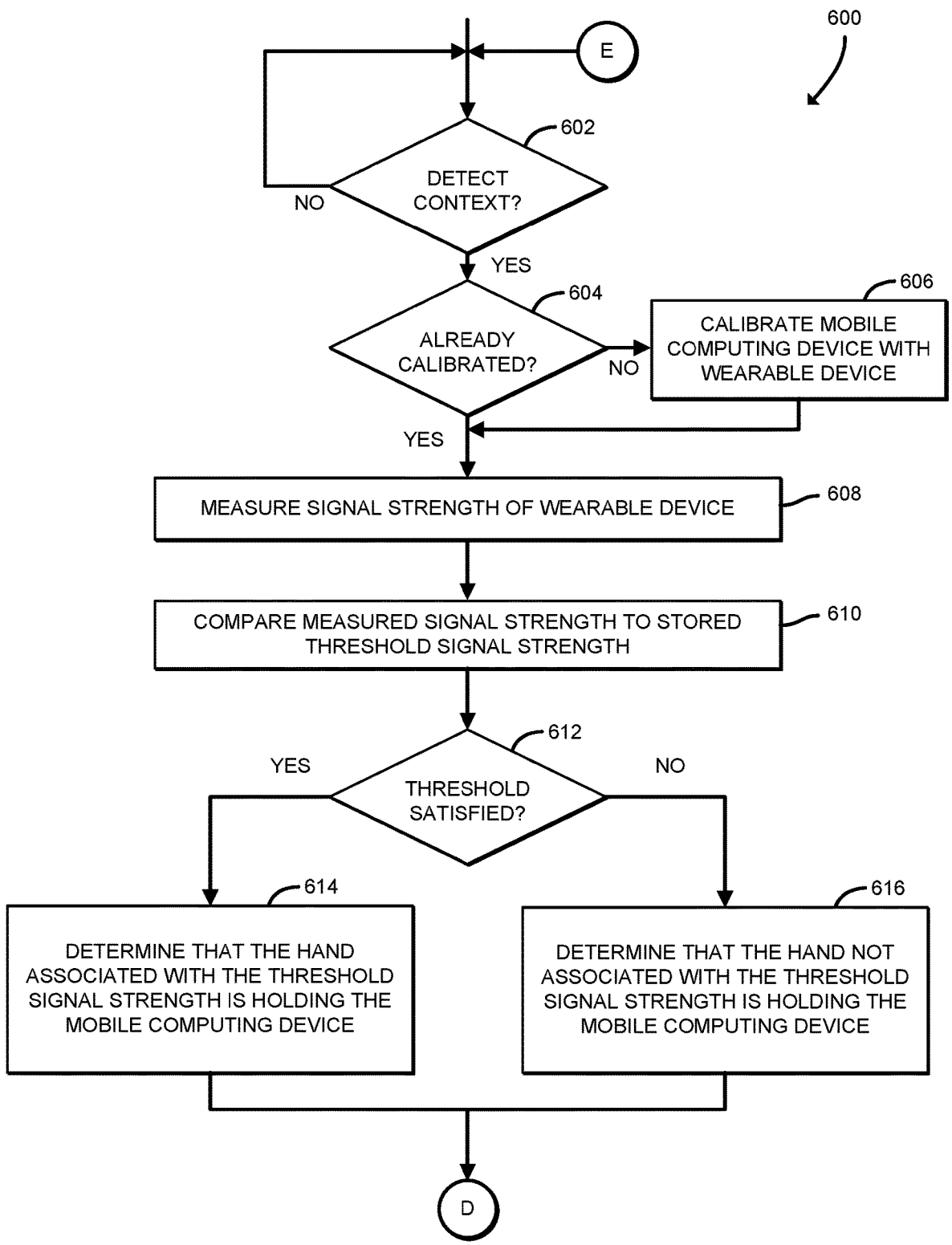
FIGS. 6 and 7 are a simplified flow diagram of at least one embodiment of a method for configuring a graphical user interface (GUI) of the mobile compute device of FIG. 1 based on which hand is used to hold the mobile compute device.

Referring now to FIG. 6, in use, the mobile compute device 110 may execute a method 600 for configuring a GUI of the mobile compute device 110 based on which hand is used to hold the mobile compute device 110. The method begins in block 602, in which the mobile compute device 110 determines whether to detect the context of the mobile compute device. As described above, the mobile compute device 110 may periodically detect the context, based on a counter and/or may detect the context in response to a request from an application executing on the mobile compute device 110. Regardless, if the mobile compute device 110 determines to detect the context, the method advances to block 604 to determine whether the mobile compute device 604 has been calibrated. If, on the other hand, the mobile compute device 110 determines not to detect the context, the method loops back to block 602 to again determine whether to detect the context. Referring again to block 604, the mobile compute device 110 may determine whether the mobile compute device 110 has been calibrated by attempting to read one or more of the threshold signal strength value, the indication of which hand is associated with the wearable device 120, or the user GUI preference from the settings 302. If the data is not present in the settings 302, the method advances to block 606 in which the mobile compute device performs the method 400 of FIGS. 4-5 to calibrate the mobile compute device 110. Otherwise, the method advances to block 608, in which the mobile compute device 110 measures the strength of the wireless signal from the wearable device 120.

In block 610, the mobile compute device 110 compares the measured signal strength to the stored threshold signal strength value. In block 612, the mobile compute device 110 determines whether the threshold signal strength value is satisfied. For example, the mobile compute device 110 may determine whether the measured signal strength is at least equal to the stored threshold signal strength value. If the mobile compute device 110 determines that the threshold signal strength value is satisfied, then the method advances to block 614 in which the mobile compute device 110 determines that the mobile compute device 110 is being held by the hand 130 associated with the threshold signal strength value (i.e., the hand 130 associated with the wearable device 120). Otherwise, the method advances to block 616 in which the mobile compute device 110 determines that the hand that is not associated with the threshold signal strength value is holding the mobile compute device 110 (i.e., the hand that is not associated with the wearable device 120).

Figure 7:
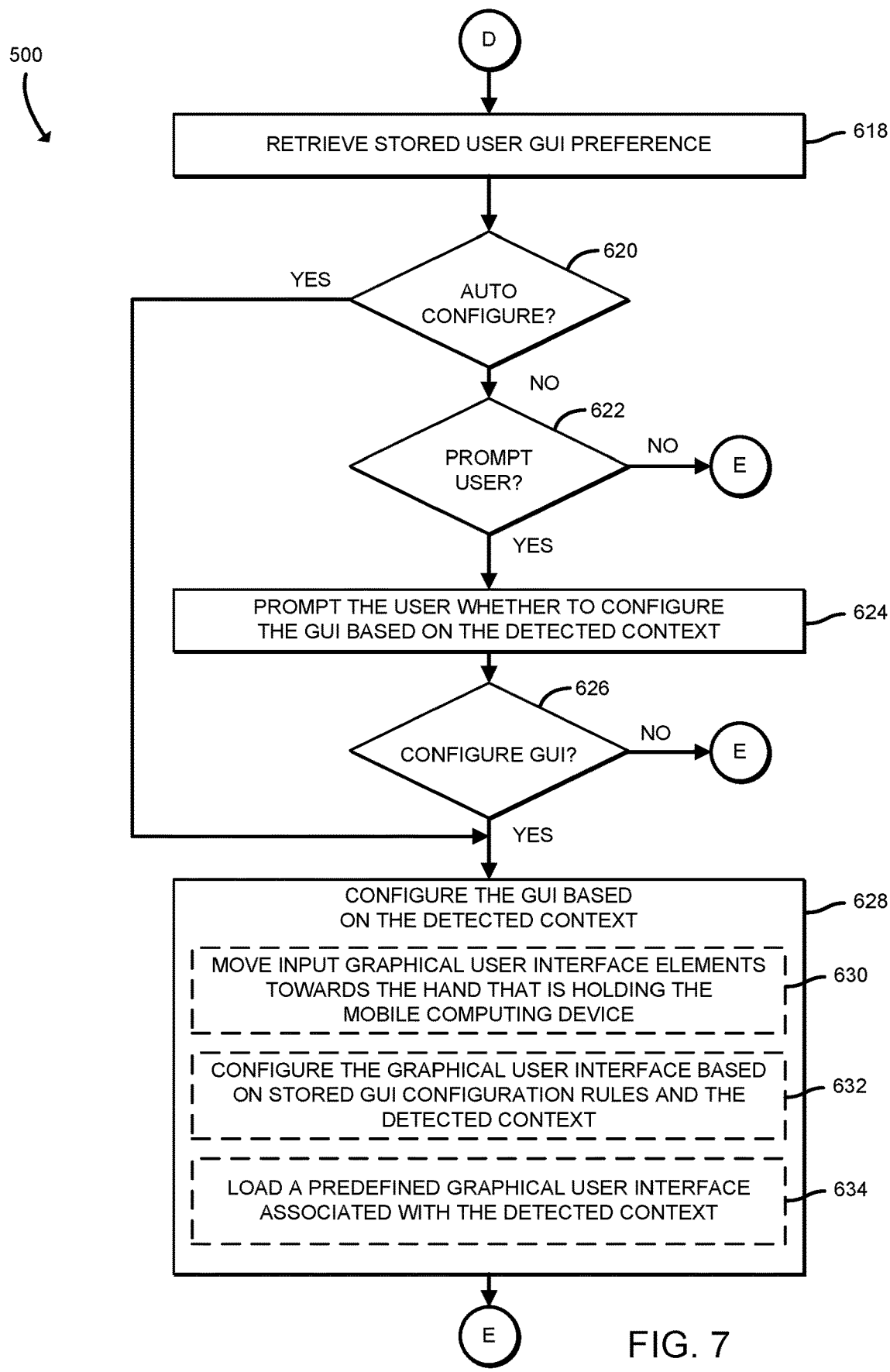

Regardless, the method 600 advances to block 618 of FIG. 7 in which the mobile compute device 110 retrieves the stored user GUI preference from the settings 302. In block 620, the mobile compute device 110 determines whether the user GUI preference is to automatically configure the GUI in response to detecting the context. If the user GUI preference is not to automatically configure the GUI, then the method advances to block 622, in which the mobile compute device 110 determines whether the user GUI preference is to prompt the user upon detecting the context. If the user GUI preference is not to prompt the user upon detecting the context, then the method 600 loops back to block 602 to again determine whether to detect the context. More specifically, in the illustrative embodiment, if the user GUI preference is not to automatically configure the GUI and is not to prompt the user, then the user GUI preference is to do nothing. If, however, the user GUI preference is to prompt the user, then the method advances from block 622 to block 624. In block 624, the mobile compute device 110 prompts the user whether to configure the GUI based on the detected context. The mobile compute device 110 receives a response from the user and, in block 626, determines whether to configure the GUI, based on the user's response. If the user's response is not to configure the GUI, then the method loops back to block 602 to again determine whether to detect the context.

Referring back to block 620, if the user GUI preference is to automatically configure the GUI or if the user's response in block 626 is to configure the GUI, then the method 600 advances to block 628 in which the mobile compute device 110 configures the GUI based on the detected context. In doing so, the mobile compute device 110 may move one or more input GUI elements towards the hand that is holding the mobile compute device (e.g., the hand 130 that is associated with the wearable device 120), as indicated in block 630. As indicated in block 632, the mobile compute device 110 may configure the GUI based on storage layout rules, such as GUI configuration rules 304, and the detected context (i.e., which hand is holding the mobile compute device 110). The GUI configuration rules 304 may specify one or more graphical user interface elements to move, based on which hand is holding the device, and the distances and directions in which to move the graphical user interface elements, or the locations to which to move the specified graphical user interface elements. The distances or locations may be specified in pixels, percentages of screen size, or other units. As indicated in block 634, the mobile compute device 110 may load a predefined GUI (e.g., a predefined graphical user interface 306) associated with the detected context, rather than or in addition to using the GUI configuration rules.

Figure 8:
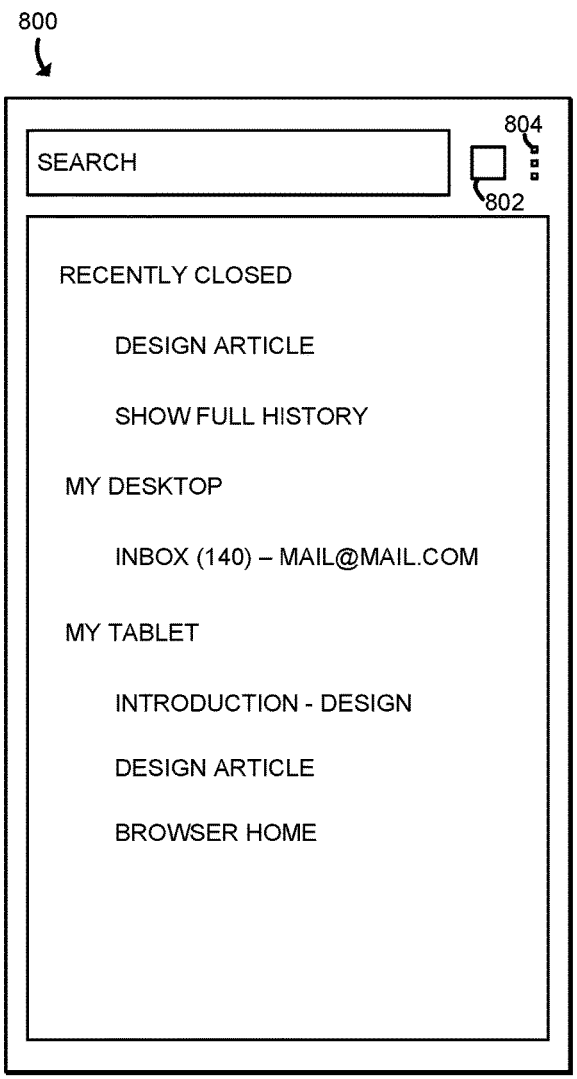
FIG. 8 is a simplified illustration of at least one embodiment of a GUI displayed by the mobile compute device of FIG. 1 when held by a hand of a user.
Figure 9:
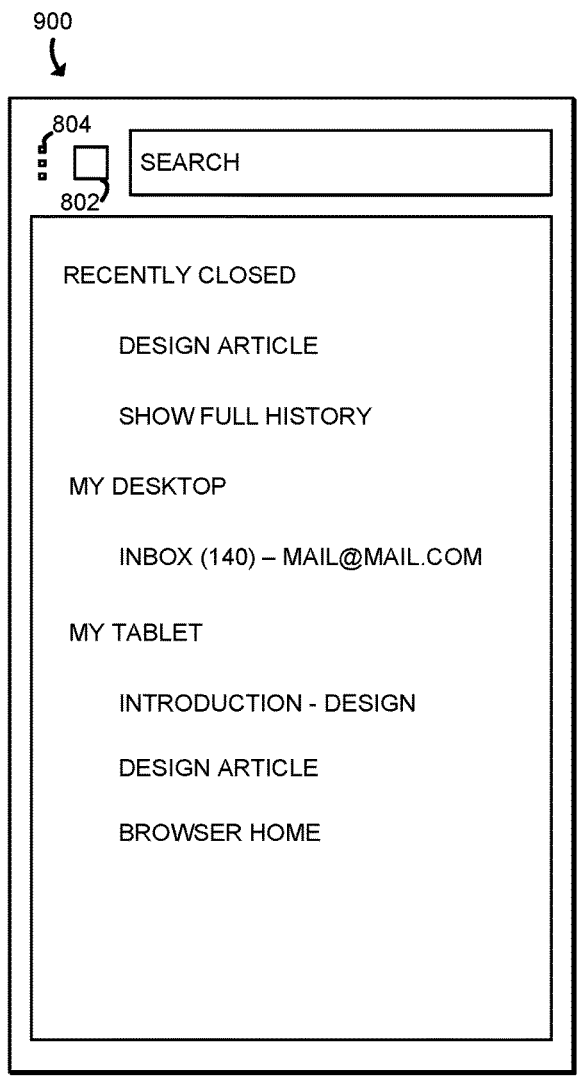
FIG. 9 is a simplified illustration of at least one embodiment of a reconfigured GUI displayed by the mobile compute device of FIG. 1 when held by a different hand of the user.
Figure 10:
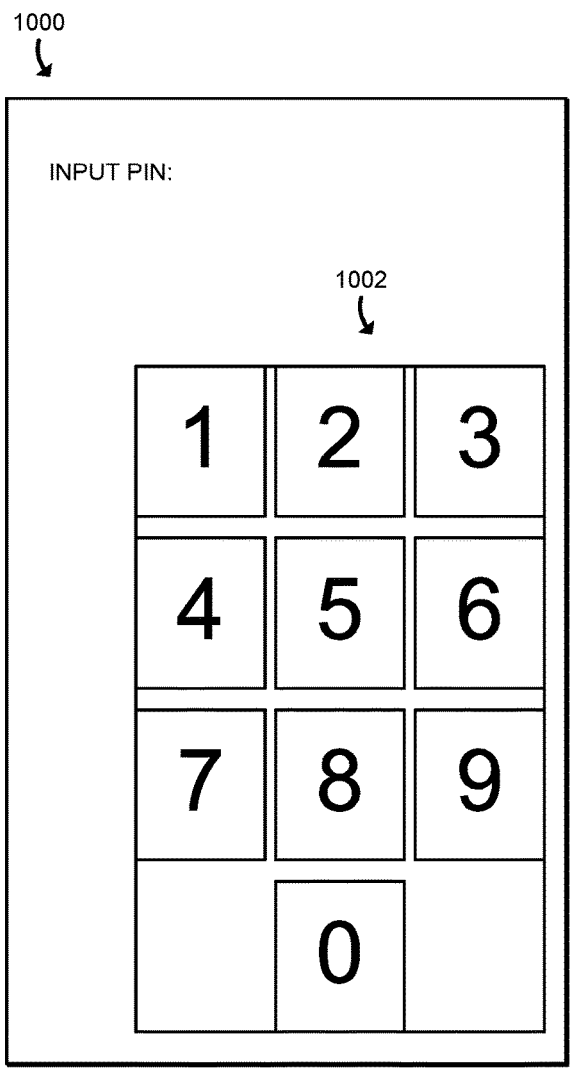
FIG. 10 is a simplified illustration of at least one embodiment of a GUI that includes a virtual keyboard displayed by the mobile compute device of FIG. 1 when held by a hand of the user.
Figure 11:
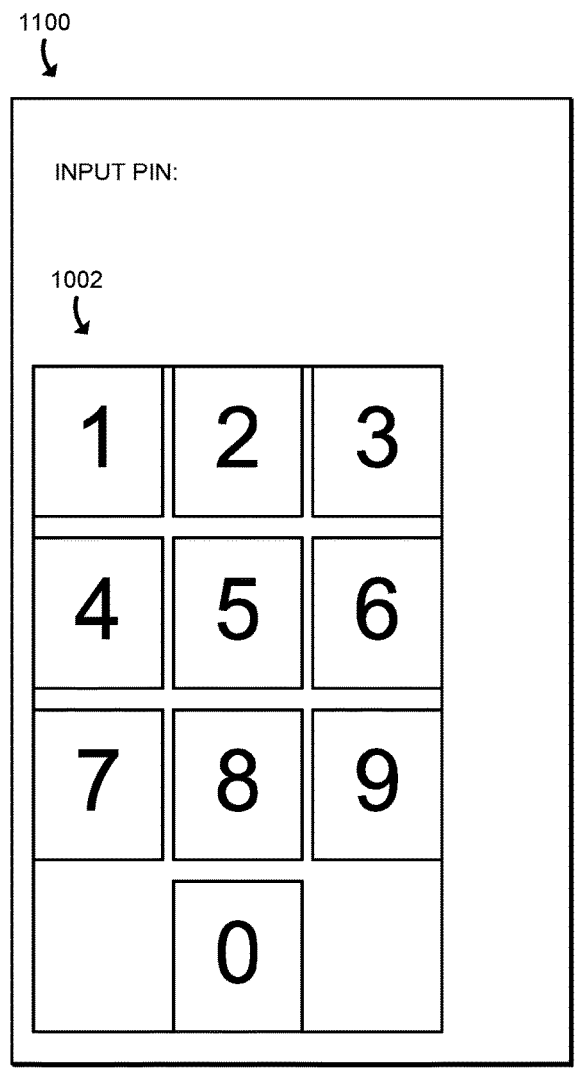
FIG. 11 is a simplified illustration of at least one embodiment of a reconfigured GUI that includes a virtual keyboard displayed by the mobile compute device of FIG. 1 when held by a different hand of the user.

For example, referring to FIG. 8, the mobile compute device 110 may display a GUI 800 when the mobile compute device 110 is held with the user's right hand (e.g., the hand 130), in which graphical user interface elements 802 and 804 are located near a right side of the GUI 800. Referring to FIG. 9, by contrast, the mobile compute device 110 may display a reconfigured GUI 900 when the mobile compute device is held with the user's left hand. In the GUI 900, the graphical user interface elements 802 and 804 are located near a left side of the GUI 900 to enable the user to more easily touch the user interface elements 802 and 804 with the thumb of the left hand. Similarly, referring to FIG. 10, the mobile compute device 110 may display a GUI 1000 when the mobile compute device 110 is held with the user's right hand. In the GUI 1000, a virtual keyboard 1002 is located near a right side of the GUI 1000. Although the virtual keyboard 1002 is shown as a number pad, it should be understood that in other embodiments, the virtual keyboard 1002 may be embodied as or include an alphanumeric virtual keyboard or other type of virtual keyboard. Referring now to FIG. 11, by contrast, the mobile compute device 110 may display a reconfigured GUI 1100 when the mobile compute device 110 is held with the user's left hand. In the GUI 1100, the virtual keyboard 1002 is closer to the left side of the GUI 1100. Referring back to FIG. 7, after the mobile compute device 110 configures the GUI based on detected context, the method loops back to block 602 of FIG. 6 to again determine whether to detect the context.

EXAMPLES

Illustrative examples of the devices, systems, and methods disclosed herein are provided below. An embodiment of the devices, systems, and methods may include any one or more, and any combination of, the examples described below.

Example 1 includes a mobile compute device for configuring a graphical user interface (GUI) based on which hand the mobile compute device is held with, the mobile compute device comprising a touchscreen display; a wireless signal sensor to receive a wireless signal transmitted by a wearable device associated with one of a left hand or a right hand of a user; a context determination module to (i) measure a strength of the wireless signal and (ii) identify which hand of the user is presently used to hold the mobile compute device based on the measured strength of the wireless signal; and a graphical user interface manager module to configure a graphical user interface displayed on the touchscreen display based on the identification of the hand of the user presently used to hold the mobile compute device.

Example 2 includes the subject matter of Example 1, and wherein to identify which hand of the user is presently used to hold the mobile compute device comprises to retrieve a threshold signal strength value stored in association with an indication of one of the left hand or the right hand; compare the measured signal strength with the threshold signal strength value to determine whether the measured signal strength satisfies the threshold signal strength value; and determine that the mobile compute device is held by the indicated one of the left hand or the right hand in response to a determination that the measured signal strength satisfies the threshold signal strength value.

Example 3 includes the subject matter of any of Examples 1 and 2, and wherein to identify which hand of the user is presently used to hold the mobile compute device comprises to retrieve a threshold signal strength value stored in association with an indication of one of the left hand or the right hand; compare the measured signal strength with the threshold signal strength value to determine whether the measured signal strength satisfies the threshold signal strength value; and determine that the mobile compute device is not held by the indicated one of the left hand or the right hand in response to a determination that the measured signal strength does not satisfy the threshold signal strength value.

Example 4 includes the subject matter of any of Examples 1-3, and wherein to configure the graphical user interface comprises to move at least one graphical user interface input element toward the hand of the user presently used to hold the mobile compute device.

Example 5 includes the subject matter of any of Examples 1-4, and wherein to configure the graphical user interface comprises to retrieve at least one predefined graphical user interface configuration rule stored in association with the identification of the hand of the user presently used to hold the mobile compute device; and apply the at least one predefined graphical user interface configuration rule to the graphical user interface based on the identification of the hand of the user presently used to hold the mobile compute device.

Example 6 includes the subject matter of any of Examples 1-5, and wherein to configure the graphical user interface comprises to retrieve a predefined graphical user interface stored in association with the identification of the hand of the user presently used to hold the mobile compute device; and display the predefined graphical user interface.

Example 7 includes the subject matter of any of Examples 1-6, and wherein the context determination module is further to perform a calibration process to establish a threshold signal strength value that indicates that the mobile compute device is presently held by the hand that is associated with the wearable device.

Example 8 includes the subject matter of any of Examples 1-7, and wherein the context determination module is further to store an indication in association with the threshold signal strength value that indicates which of the left hand or the right hand the wearable device is associated with.

Example 9 includes the subject matter of any of Examples 1-8, and wherein to perform a calibration process to establish a threshold signal strength value comprises to prompt the user to hold the mobile compute device with the hand associated with the wearable device; measure the strength of the wireless signal when the mobile compute device is held by the hand associated with the wearable device; prompt the user to hold the mobile compute device with the hand that is not associated with the wearable device; and measure the strength of the wireless signal when the mobile compute device is held by the hand that is not associated with the wearable device.

Example 10 includes the subject matter of any of Examples 1-9, and wherein to perform a calibration process to establish a threshold signal strength comprises to measure a first signal strength when the mobile compute device is held by the hand associated with the wearable device a first time; measure a second signal strength when the mobile compute device is held by the hand associated with the wearable device a second time; and establish the threshold signal strength value as an average of the first signal strength and the second signal strength.

Example 11 includes the subject matter of any of Examples 1-10, and wherein the context determination module is further to prompt the user for a user graphical user interface (GUI) preference on how to modify the graphical user interface based on the identification of the hand of the user presently used to hold the mobile compute device; and store the user GUI preference; and wherein the user interface manager module is further to retrieve the stored user GUI preference in response to the identification of which hand of the user is presently used to hold the mobile compute device.

Example 12 includes the subject matter of any of Examples 1-11, and, wherein the user interface manager module is further to determine whether the stored user GUI preference indicates to prompt the user in response to the identification of which hand of the user is presently used to hold the mobile compute device; display, in response to a determination that the stored user GUI preference indicates that the user is to be prompted, a prompt that requests the user to select whether to configure the graphical user interface; and configure the graphical user interface in response to a user selection from the prompt to configure the graphical user interface.

Example 13 includes the subject matter of any of Examples 1-12, and wherein the user interface manager module is further to determine that the stored user GUI preference indicates to automatically configure the graphical user interface in response to the identification of which hand of the user is presently used to hold the mobile compute device; and configure the graphical user interface in response to the identification of which hand of the user is presently used to hold the mobile compute device and the determination that the stored user preference indicates to automatically configure the graphical user interface.

Example 14 includes the subject matter of any of Examples 1-13, and wherein the wireless signal sensor includes at least one of a near field communication signal sensor or a Bluetooth signal sensor.

Example 15 includes the subject matter of any of Examples 1-14, and wherein the context determination module is further to receive a request from an application executed by the mobile compute device to identify which hand of the user is presently used to hold the mobile compute device; and provide to the application, in response to the request, the identification the hand of the user presently used to hold the mobile compute device.

Example 16 includes a method for configuring a graphical user interface (GUI) displayed by a mobile compute device, based on which hand the mobile compute device is held with, the method comprising receiving, by the mobile compute device, a wireless signal transmitted by a wearable device associated with one of a left hand or a right hand of a user; measuring, by the mobile compute device, a strength of the wireless signal; identifying, by the mobile compute device, which hand of the user is presently used to hold the mobile compute device based on the measured strength of the wireless signal; and configuring, by the mobile compute device, a graphical user interface displayed on the touchscreen display based on the identification of the hand of the user presently used to hold the mobile compute device.

Example 17 includes the subject matter of Example 16, and wherein identifying which hand of the user is presently used to hold the mobile compute device comprises retrieving, by the mobile compute device, a threshold signal strength value stored in association with an indication of one of the left hand or the right hand; comparing, by the mobile compute device, the measured signal strength with the threshold signal strength value to determine whether the measured signal strength satisfies the threshold signal strength value; and determining, by the mobile compute device, that the mobile compute device is held by the indicated one of the left hand or the right hand in response to a determination that the measured signal strength satisfies the threshold signal strength value.

Example 18 includes the subject matter of any of Examples 16 and 17, and wherein identifying which hand of the user is presently used to hold the mobile compute device comprises retrieving, by the mobile compute device, a threshold signal strength value stored in association with an indication of one of the left hand or the right hand; comparing, by the mobile compute device, the measured signal strength with the threshold signal strength value to determine whether the measured signal strength satisfies the threshold signal strength value; and determining, by the mobile compute device, that the mobile compute device is not held by the indicated one of the left hand or the right hand in response to a determination that the measured signal strength does not satisfy the threshold signal strength value.

Example 19 includes the subject matter of any of Examples 16-18, and wherein configuring the graphical user interface comprises moving, by the mobile compute device, at least one graphical user interface input element toward the hand of the user presently used to hold the mobile compute device.

Example 20 includes the subject matter of any of Examples 16-19, and wherein configuring the graphical user interface comprises retrieving, by the mobile compute device, at least one predefined graphical user interface configuration rule stored in association with the identification of the hand of the user presently used to hold the mobile compute device; and applying, by the mobile compute device, the at least one predefined graphical user interface configuration rule to the graphical user interface based on the identification of the hand of the user presently used to hold the mobile compute device.

Example 21 includes the subject matter of any of Examples 16-20, and wherein configuring the graphical user interface comprises retrieving, by the mobile compute device, a predefined graphical user interface stored in association with the identification of the hand of the user presently used to hold the mobile compute device; and displaying, by the mobile compute device, the predefined graphical user interface.

Example 22 includes the subject matter of any of Examples 16-21, and further including performing, by the mobile compute device, a calibration process to establish a threshold signal strength value that indicates that the mobile compute device is presently held by the hand that is associated with the wearable device.

Example 23 includes the subject matter of any of Examples 16-22, and further including storing an indication in association with the threshold signal strength value that indicates which of the left hand or the right hand the wearable device is associated with.

Example 24 includes the subject matter of any of Examples 16-23, and wherein performing a calibration process to establish a threshold signal strength value comprises prompting, by the mobile compute device, the user to hold the mobile compute device with the hand associated with the wearable device; measuring, by the mobile compute device, the strength of the wireless signal when the mobile compute device is held by the hand associated with the wearable device; prompting, by the mobile compute device, the user to hold the mobile compute device with the hand that is not associated with the wearable device; and measuring, by the mobile compute device, the strength of the wireless signal when the mobile compute device is held by the hand that is not associated with the wearable device.

Example 25 includes the subject matter of any of Examples 16-24, and wherein performing a calibration process to establish a threshold signal strength comprises measuring, by the mobile compute device, a first signal strength when the mobile compute device is held by the hand associated with the wearable device a first time; measuring, by the mobile compute device, a second signal strength when the mobile compute device is held by the hand associated with the wearable device a second time; and establishing, by the mobile compute device, the threshold signal strength value as an average of the first signal strength and the second signal strength.

Example 26 includes the subject matter of any of Examples 16-25, and further including prompting, by the mobile compute device, the user for a user graphical user interface (GUI) preference on how to modify the graphical user interface based on the identification of the hand of the user presently used to hold the mobile compute device; storing, by the mobile compute device, the user GUI preference; and retrieving, by the mobile compute device, the stored user GUI preference in response to the identification of which hand of the user is presently used to hold the mobile compute device.

Example 27 includes the subject matter of any of Examples 16-26, and further including determining, by the mobile compute device, whether the stored user GUI preference indicates to prompt the user in response to the identification of which hand of the user is presently used to hold the mobile compute device; display, by the mobile compute device, in response to a determination that the stored user GUI preference indicates that the user is to be prompted, a prompt that requests the user to select whether to configure the graphical user interface; and configuring, by the mobile compute device, the graphical user interface in response to a user selection from the prompt to configure the graphical user interface.

Example 28 includes the subject matter of any of Examples 16-27, and further including determining, by the mobile compute device, that the stored user GUI preference indicates to automatically configure the graphical user interface in response to the identification of which hand of the user is presently used to hold the mobile compute device; and configuring, by the mobile compute device, the graphical user interface in response to the identification of which hand of the user is presently used to hold the mobile compute device and the determination that the stored user preference indicates to automatically configure the graphical user interface.

Example 29 includes the subject matter of any of Examples 16-28, and wherein receiving the wireless signal comprises receiving at least one of a near field communication signal or a Bluetooth signal.

Example 30 includes the subject matter of any of Examples 16-29, and further including receiving, by the mobile compute device, a request from an application executed by the mobile compute device to identify which hand of the user is presently used to hold the mobile compute device; and providing, by the mobile compute device, to the application, in response to the request, the identification the hand of the user presently used to hold the mobile compute device.

Example 31 includes one or more computer-readable storage media comprising a plurality of instructions that, when executed, cause a mobile compute device to perform the method of any of Examples 16-30.

Example 32 includes a mobile compute device for configuring a graphical user interface (GUI) based on which hand the mobile compute device is held with, the mobile compute device comprising means for receiving a wireless signal transmitted by a wearable device associated with one of a left hand or a right hand of a user; means for measuring a strength of the wireless signal; means for identifying which hand of the user is presently used to hold the mobile compute device based on the measured strength of the wireless signal; and means for configuring a graphical user interface displayed on the touchscreen display based on the identification of the hand of the user presently used to hold the mobile compute device.

Example 33 includes the subject matter of Example 32, and wherein the means for identifying which hand of the user is presently used to hold the mobile compute device comprises means for retrieving a threshold signal strength value stored in association with an indication of one of the left hand or the right hand; means for comparing the measured signal strength with the threshold signal strength value to determine whether the measured signal strength satisfies the threshold signal strength value; and means for determining that the mobile compute device is held by the indicated one of the left hand or the right hand in response to a determination that the measured signal strength satisfies the threshold signal strength value.

Example 34 includes the subject matter of any of Examples 32 and 33, and wherein the means for identifying which hand of the user is presently used to hold the mobile compute device comprises means for retrieving a threshold signal strength value stored in association with an indication of one of the left hand or the right hand; means for comparing the measured signal strength with the threshold signal strength value to determine whether the measured signal strength satisfies the threshold signal strength value; and means for determining that the mobile compute device is not held by the indicated one of the left hand or the right hand in response to a determination that the measured signal strength does not satisfy the threshold signal strength value.

Example 35 includes the subject matter of any of Examples 32-34, and wherein the means for configuring the graphical user interface comprises means for moving at least one graphical user interface input element toward the hand of the user presently used to hold the mobile compute device.

Example 36 includes the subject matter of any of Examples 32-35, and wherein the means for configuring the graphical user interface comprises means for retrieving at least one predefined graphical user interface configuration rule stored in association with the identification of the hand of the user presently used to hold the mobile compute device; and means for applying the at least one predefined graphical user interface configuration rule to the graphical user interface based on the identification of the hand of the user presently used to hold the mobile compute device.

Example 37 includes the subject matter of any of Examples 32-36, and wherein the means for configuring the graphical user interface comprises means for retrieving a predefined graphical user interface stored in association with the identification of the hand of the user presently used to hold the mobile compute device; and means for displaying the predefined graphical user interface.

Example 38 includes the subject matter of any of Examples 32-37 and further including means for performing a calibration process to establish a threshold signal strength value that indicates that the mobile compute device is presently held by the hand that is associated with the wearable device.

Example 39 includes the subject matter of any of Examples 32-38, and further including means for storing an indication in association with the threshold signal strength value that indicates which of the left hand or the right hand the wearable device is associated with.

Example 40 includes the subject matter of any of Examples 32-39, and wherein the means for performing a calibration process to establish a threshold signal strength value comprises means for prompting the user to hold the mobile compute device with the hand associated with the wearable device; means for measuring the strength of the wireless signal when the mobile compute device is held by the hand associated with the wearable device; means for prompting the user to hold the mobile compute device with the hand that is not associated with the wearable device; and means for measuring the strength of the wireless signal when the mobile compute device is held by the hand that is not associated with the wearable device.

Example 41 includes the subject matter of any of Examples 32-40, and wherein the means for performing a calibration process to establish a threshold signal strength comprises means for measuring a first signal strength when the mobile compute device is held by the hand associated with the wearable device a first time; means for measuring a second signal strength when the mobile compute device is held by the hand associated with the wearable device a second time; and means for establishing the threshold signal strength value as an average of the first signal strength and the second signal strength.

Example 42 includes the subject matter of any of Examples 32-41, and further including means for prompting the user for a user graphical user interface (GUI) preference on how to modify the graphical user interface based on the identification of the hand of the user presently used to hold the mobile compute device; means for storing the user GUI preference; and means for retrieving the stored user GUI preference in response to the identification of which hand of the user is presently used to hold the mobile compute device.

Example 43 includes the subject matter of any of Examples 32-42, and further including means for determining whether the stored user GUI preference indicates to prompt the user in response to the identification of which hand of the user is presently used to hold the mobile compute device; means for displaying in response to a determination that the stored user GUI preference indicates that the user is to be prompted, a prompt that requests the user to select whether to configure the graphical user interface; and means for configuring the graphical user interface in response to a user selection from the prompt to configure the graphical user interface.

Example 44 includes the subject matter of any of Examples 32-43, and further including means for determining that the stored user GUI preference indicates to automatically configure the graphical user interface in response to the identification of which hand of the user is presently used to hold the mobile compute device; and means for configuring the graphical user interface in response to the identification of which hand of the user is presently used to hold the mobile compute device and the determination that the stored user preference indicates to automatically configure the graphical user interface.

Example 45 includes the subject matter of any of Examples 32-44, and wherein the means for receiving the wireless signal comprises means for receiving at least one of a near field communication signal or a Bluetooth signal.

Example 46 includes the subject matter of any of Examples 32-45, and further including means for receiving a request from an application executed by the mobile compute device to identify which hand of the user is presently used to hold the mobile compute device; and means for providing to the application, in response to the request, the identification the hand of the user presently used to hold the mobile compute device.

The invention claimed is:

1. A mobile compute device, comprising:
   a touchscreen display;
   a wireless signal sensor to receive a wireless signal transmitted by a wearable device;
   a context determination module to:
      perform a calibration process to establish, on the mobile compute device, a threshold signal strength value indicative of a target strength of the wireless signal received by the mobile compute device that indicates that the mobile compute device is presently held by one of a right hand or a left hand of a user, including prompting the user to hold the mobile compute device with the hand to be associated with the wearable device, measuring the strength of the wireless signal when the mobile compute device is held by the hand to be associated with the wearable device, prompting the user to hold the mobile compute device with the hand that is not to be associated with the wearable device, and measuring the strength of the wireless signal when the mobile compute device is held by the hand that is not to be associated with the wearable device;
      measure, after the calibration process, a strength of the wireless signal; and
      identify which hand of the user is presently used to hold the mobile compute device based on the measured strength of the wireless signal and the threshold signal strength value; and
   a graphical user interface manager module to configure a graphical user interface displayed on the touchscreen display based on the identification of the hand of the user presently used to hold the mobile compute device.

2. The mobile compute device of claim 1, wherein to identify which hand of the user is presently used to hold the mobile compute device comprises to:
   retrieve the threshold signal strength value stored in association with an indication of one of the left hand or the right hand;
   compare the measured signal strength with the threshold signal strength value to determine whether the measured signal strength satisfies the threshold signal strength value; and
   determine that the mobile compute device is held by the indicated one of the left hand or the right hand in response to a determination that the measured signal strength satisfies the threshold signal strength value.

3. The mobile compute device of claim 1, wherein to identify which hand of the user is presently used to hold the mobile compute device comprises to:
   retrieve the threshold signal strength value stored in association with an indication of one of the left hand or the right hand;
   compare the measured signal strength with the threshold signal strength value to determine whether the measured signal strength satisfies the threshold signal strength value; and
   determine that the mobile compute device is not held by the indicated one of the left hand or the right hand in response to a determination that the measured signal strength does not satisfy the threshold signal strength value.

4. The mobile compute device of claim 1, wherein to configure the graphical user interface comprises to move at least one graphical user interface input element toward the hand of the user presently used to hold the mobile compute device.

5. The mobile compute device of claim 1, wherein to configure the graphical user interface comprises to:
retrieve at least one predefined graphical user interface configuration rule stored in association with the identification of the hand of the user presently used to hold the mobile compute device; and
apply the at least one predefined graphical user interface configuration rule to the graphical user interface based on the identification of the hand of the user presently used to hold the mobile compute device.

6. The mobile compute device of claim 1, wherein to configure the graphical user interface comprises to:
retrieve a predefined graphical user interface stored in association with the identification of the hand of the user presently used to hold the mobile compute device; and
display the predefined graphical user interface.

7. The mobile compute device of claim 1, wherein the context determination module is further to store an indication in association with the threshold signal strength value that indicates which of the left hand or the right hand the wearable device is associated with.

8. One or more non-transitory computer-readable storage media comprising a plurality of instructions that, when executed, cause a mobile compute device to:
perform a calibration process to establish, on the mobile compute device, a threshold signal strength value indicative of a target strength of a wireless signal to be received by the mobile compute device that indicates that the mobile compute device is presently held by one of a right hand or a left hand of a user, including prompting the user to hold the mobile compute device with the hand to be associated with a wearable device, measuring the strength of the wireless signal when the mobile compute device is held by the hand to be associated with the wearable device, prompting the user to hold the mobile compute device with the hand that is not to be associated with the wearable device, and measuring the strength of the wireless signal when the mobile compute device is held by the hand that is not to be associated with the wearable device;
receive, after the calibration process, the wireless signal transmitted by the wearable device;
measure, after the calibration process, a strength of the wireless signal;
identify which hand of the user is presently used to hold the mobile compute device based on the measured strength of the wireless signal and the threshold signal strength value; and
configure a graphical user interface displayed on a touchscreen display of the mobile compute device based on the identification of the hand of the user presently used to hold the mobile compute device.

9. The one or more non-transitory computer-readable storage media of claim 8, wherein the plurality of instructions, when executed, further cause the mobile compute device to:
retrieve the threshold signal strength value stored in association with an indication of one of the left hand or the right hand;
compare the measured signal strength with the threshold signal strength value to determine whether the measured signal strength satisfies the threshold signal strength value; and
determine that the mobile compute device is held by the indicated one of the left hand or the right hand in response to a determination that the measured signal strength satisfies the threshold signal strength value.

10. The one or more non-transitory computer-readable storage media of claim 8, wherein to identify which hand of the user is presently used to hold the mobile compute device comprises to:
retrieve the threshold signal strength value stored in association with an indication of one of the left hand or the right hand;
compare the measured signal strength with the threshold signal strength value to determine whether the measured signal strength satisfies the threshold signal strength value; and
determine that the mobile compute device is not held by the indicated one of the left hand or the right hand in response to a determination that the measured signal strength does not satisfy the threshold signal strength value.

11. The one or more non-transitory computer-readable storage media of claim 8, wherein to configure the graphical user interface comprises to move at least one graphical user interface input element toward the hand of the user presently used to hold the mobile compute device.

12. The one or more non-transitory computer-readable storage media of claim 8, wherein to configure the graphical user interface comprises to:
retrieve at least one predefined graphical user interface configuration rule stored in association with the identification of the hand of the user presently used to hold the mobile compute device; and
apply the at least one predefined graphical user interface configuration rule to the graphical user interface based on the identification of the hand of the user presently used to hold the mobile compute device.

13. The one or more non-transitory computer-readable storage media of claim 8, wherein to configure the graphical user interface comprises to:
retrieve a predefined graphical user interface stored in association with the identification of the hand of the user presently used to hold the mobile compute device; and
display the predefined graphical user interface.

14. The one or more non-transitory computer-readable storage media of claim 8, wherein the plurality of instructions further cause the mobile compute device to store an indication in association with the threshold signal strength value that indicates which of the left hand or the right hand the wearable device is associated with.

15. A method for configuring a graphical user interface (GUI) on a mobile compute device, the method comprising:
performing, by the mobile compute device, a calibration process to establish, on the mobile compute device, a threshold signal strength value indicative of a target strength of a wireless signal to be received by the mobile compute device that indicates that the mobile compute device is presently held by one of a right hand or a left hand of a user, including prompting the user to hold the mobile compute device with the hand to be associated with a wearable device, measuring the strength of the wireless signal when the mobile compute device is held by the hand to be associated with the wearable device, prompting the user to hold the mobile compute device with the hand that is not to be associated with the wearable device, and measuring the strength of the wireless signal when the mobile compute device is held by the hand that is not to be associated with the wearable device;

receiving, by the mobile compute device and after the calibration process, the wireless signal transmitted by the wearable device;

measuring, by the mobile compute device and after the calibration process, a strength of the wireless signal;

identifying, by the mobile compute device, which hand of the user is presently used to hold the mobile compute device based on the measured strength of the wireless signal and the threshold signal strength value; and configuring, by the mobile compute device, a graphical user interface displayed on a touchscreen display of the mobile compute device based on the identification of the hand of the user presently used to hold the mobile compute device.

16. The method of claim 15, wherein identifying which hand of the user is presently used to hold the mobile compute device comprises:

retrieving, by the mobile compute device, the threshold signal strength value stored in association with an indication of one of the left hand or the right hand;

comparing, by the mobile compute device, the measured signal strength with the threshold signal strength value to determine whether the measured signal strength satisfies the threshold signal strength value; and determining, by the mobile compute device, that the mobile compute device is held by the indicated one of the left hand or the right hand in response to a determination that the measured signal strength satisfies the threshold signal strength value.

17. The method of claim 15, wherein identifying which hand of the user is presently used to hold the mobile compute device comprises:

retrieving, by the mobile compute device, the threshold signal strength value stored in association with an indication of one of the left hand or the right hand;

comparing, by the mobile compute device, the measured signal strength with the threshold signal strength value to determine whether the measured signal strength satisfies the threshold signal strength value; and determining, by the mobile compute device, that the mobile compute device is not held by the indicated one of the left hand or the right hand in response to a determination that the measured signal strength does not satisfy the threshold signal strength value.

18. The method of claim 15, wherein configuring the graphical user interface comprises moving, by the mobile compute device, at least one graphical user interface input element toward the hand of the user presently used to hold the mobile compute device.

19. The method of claim 15, wherein configuring the graphical user interface comprises:

retrieving, by the mobile compute device, at least one predefined graphical user interface configuration rule stored in association with the identification of the hand of the user presently used to hold the mobile compute device; and applying, by the mobile compute device, the at least one predefined graphical user interface configuration rule to the graphical user interface based on the identification of the hand of the user presently used to hold the mobile compute device.

20. The method of claim 15, wherein configuring the graphical user interface comprises:

retrieving, by the mobile compute device, a predefined graphical user interface stored in association with the identification of the hand of the user presently used to hold the mobile compute device; and displaying, by the mobile compute device, the predefined graphical user interface.

21. The method of claim 15, further comprising storing an indication in association with the threshold signal strength value that indicates which of the left hand or the right hand the wearable device is associated with.

* * * * *